United States Patent
Nakayama

(10) Patent No.: US 8,155,476 B2
(45) Date of Patent: Apr. 10, 2012

(54) IMAGE PROCESSING APPARATUS, IMAGE PROCESSING METHOD, AND PROGRAM

(75) Inventor: Tadayoshi Nakayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 909 days.

(21) Appl. No.: 12/132,415

(22) Filed: Jun. 3, 2008

(65) Prior Publication Data

US 2008/0303951 A1 Dec. 11, 2008

(30) Foreign Application Priority Data

Jun. 5, 2007 (JP) .................................. 2007-149556

(51) Int. Cl.
*G06K 9/40* (2006.01)

(52) U.S. Cl. ......... 382/275; 348/241; 348/622; 348/666

(58) Field of Classification Search ........................ None
See application file for complete search history.

(56) References Cited

U.S. PATENT DOCUMENTS

| | | | | |
|---|---|---|---|---|
| 4,748,498 A | * | 5/1988 | Yamanishi et al. | 348/622 |
| 5,130,798 A | | 7/1992 | Christopher | |
| 5,333,054 A | * | 7/1994 | Tanaka et al. | 348/666 |
| 2007/0071354 A1 | | 3/2007 | Florent et al. | |
| 2007/0257997 A1 | * | 11/2007 | Tanizoe | 348/241 |

FOREIGN PATENT DOCUMENTS

| | | | |
|---|---|---|---|
| CN | 1063983 A | | 8/1992 |
| DE | 3617827 | | 12/1987 |
| EP | 0497221 B1 | | 6/1997 |
| JP | 1-273487 A | | 11/1989 |
| JP | 02288550 A | * | 11/1990 |
| JP | 02291783 A | * | 12/1990 |
| JP | 3158371 B | | 7/1991 |
| JP | 09102891 A | | 4/1997 |
| JP | 2001045334 A | * | 2/2001 |
| JP | 2007094555 A | | 4/2007 |

* cited by examiner

*Primary Examiner* — Anand Bhatnagar
*Assistant Examiner* — Tsung-Yin Tsai
(74) *Attorney, Agent, or Firm* — Canon U.S.A., Inc. IP Division

(57) ABSTRACT

An image processing apparatus includes a noise reduction unit configured to nonlinearly convert a signal obtained by subtracting a value of a subtraction image signal, which is read from a memory, from that of a current-frame image signal, to generate a noise-reduced signal by subtracting the nonlinearly converted signal from the current-frame image signal, and to store the noise-reduced signal in the memory, a read unit configured to read the subtraction image signal from the memory at a moment between a moment, at which the subtraction image signal read from the memory is stored in the memory, and a moment at which the subtraction image signal is read from the memory, and a generation unit configured to generate an image based on the subtraction image signal read by the read unit.

3 Claims, 11 Drawing Sheets

IMAGE PROCESSING APPARATUS, IMAGE PROCESSING METHOD, AND PROGRAM

BACKGROUND OF THE INVENTION

1. Field of the Invention

The present invention relates to an image processing apparatus, an image processing method, and a program which are suitable for use in recursive processing for noise reduction.

2. Description of the Related Art

X-ray fluoroscopic images are taken with very low X-ray doses to minimize radiation exposure adverse-effects. Accordingly, many quantum noises are superposed on the taken X-ray fluoroscopic images. Hitherto, noise reduction of the taken images has been achieved by applying recursive filtering to perform smoothing of pixels in a time direction. The recursive filtering (also referred to as inter-frame noise reduction processing) is very effective in reducing noises in a plurality of still images. However, when the recursive filtering is applied to moving images, image lags can be generated. Therefore, the recursive filter is not always effective in reducing noise in moving images.

Thus, Japanese Patent Application Laid-Open No. 1-273487 has discussed a digital X-ray apparatus capable of displaying a clear image with a smaller image lag even in a case where recursive filtering is performed on a moving image or a continuous image. This digital X-ray apparatus has a separation circuit unit, a filter circuit unit, and an addition circuit unit to achieve noise reduction processing with less image lag. This separation circuit unit separates each frame of an X-ray fluoroscopic image into a low-frequency component image and a high-frequency component image. The filter circuit unit performs recursive filtering on the high-frequency component image. The addition circuit unit adds the separated low-frequency component image to the high-frequency component image on which the recursive filtering has been performed.

Japanese Patent No. 3158371 discusses a noise reducer for reducing noise, which extracts a noise signal from a difference signal after generation of the difference signal representing a difference between a moving image reproduced by an analog video tape recorder and an image obtained by a recursive filter, and which subtracts the extracted noise signal from the reproduced moving image. This noise reducer detects motion of an image with a simple method, and changes a reduced amount of noise between the moving image and a still image. Consequently, the noise reducer performs noise reduction processing with less image lag.

As described above, X-ray doses used to take X-ray fluoroscopic images are extremely low. Thus, a huge number of noise signals due to quantum noises are superposed on each taken X-ray fluoroscopic image. Accordingly, noise reduction processing using recursive filtering is indispensable.

In a case where a conventional technique is applied to an X-ray fluoroscopic imaging apparatus having a frequency processing function, recursive filtering can be applied to a high-frequency component image obtained by a frequency component decomposition function. However, a frame memory for delaying image data by 1 frame is necessary for performing recursive filtering. In a frequency processing analysis, sometimes, an original image is reconstructed from decomposed image data after predetermined processing is performed on decomposed image data respectively corresponding to a plurality of frequency bands, into which original image data is decomposed. Accordingly, delay memories for delaying decomposed image data are needed.

That is, in the case where the conventional technique is applied to the X-ray fluoroscopic imaging apparatus having a frequency processing function, the X-ray fluoroscopic imaging apparatus requires a frame memory for delaying the original image data by 1 frame, and delay memories for delaying the decomposed image data. Consequently, in the case where the conventional technique is applied to the X-ray fluoroscopic imaging apparatus having the frequency processing function, the required memory capacity and an amount of memory access in the entire X-ray fluoroscopic imaging apparatus are dramatically increased.

In a case where images, on which frequency processing is performed, are stored in an integrated large capacity memory, an amount of access to this memory is extremely increased. In a case where recursive filtering is additionally performed using the integrated large capacity memory, an amount of memory access is considerably increased.

SUMMARY OF THE INVENTION

The present invention is directed to an image processing apparatus capable of mitigating any increase in memory capacity and an amount of memory access, which are required to perform recursive processing for noise reduction.

According to an aspect of the present invention, an image processing apparatus includes an inter-frame noise reduction unit including a frame memory, a first subtraction unit configured to subtract contents of the frame memory from a current frame image signal to generate a first signal, a nonlinear processing unit configured to nonlinearly convert the first signal to generate a nonlinearly converted first signal, and a second subtraction unit configured to subtract the nonlinearly converted first signal from the current frame image signal to generate a noise reduced image signal, wherein the noise reduced image signal is stored in the frame memory.

According to another aspect of the present invention, a method for processing an image includes subtracting contents of a frame memory from a current frame image signal to provide a first signal, nonlinearly converting the first signal to provide a nonlinearly converted first signal, generating a noise-reduced signal by subtracting the nonlinearly converted first signal from the current frame image signal, storing the noise reduced image signal in the frame memory, reading the contents of the frame memory after the first signal has been generated and before the noise reduced image signal is stored in the frame memory, and subtracting the noise reduced image signal from the current frame image signal to generate an image.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Image processing apparatuses according to exemplary embodiments of the present invention have a multi-resolution analysis function and a noise reduction function. Hereinafter, image processing apparatuses according to the exemplary embodiments, which perform both of a multi-resolution analysis and a noise reduction on moving images, are described. The image processing apparatuses according to the exemplary embodiments are suitable for use in, e.g., an X-ray fluoroscopic imaging apparatus that takes X-ray fluoroscopic images with extremely low X-ray doses. In the following description, a moving image (i.e., an X-ray fluoroscopic image) obtained by X-ray fluoroscopic imaging is described as an object to be processed by the image processing apparatuses according to the exemplary embodiments. However, objects to be processed by the image processing apparatuses according to the exemplary embodiments is not limited thereto.

First, the multi-resolution analysis function of the image processing apparatuses according to the exemplary embodiments is described.

An outline of a Laplacian pyramid decomposition/reconstruction in the multi-resolution analysis is described below with reference to FIGS. 1 and 2.

Figure 1:
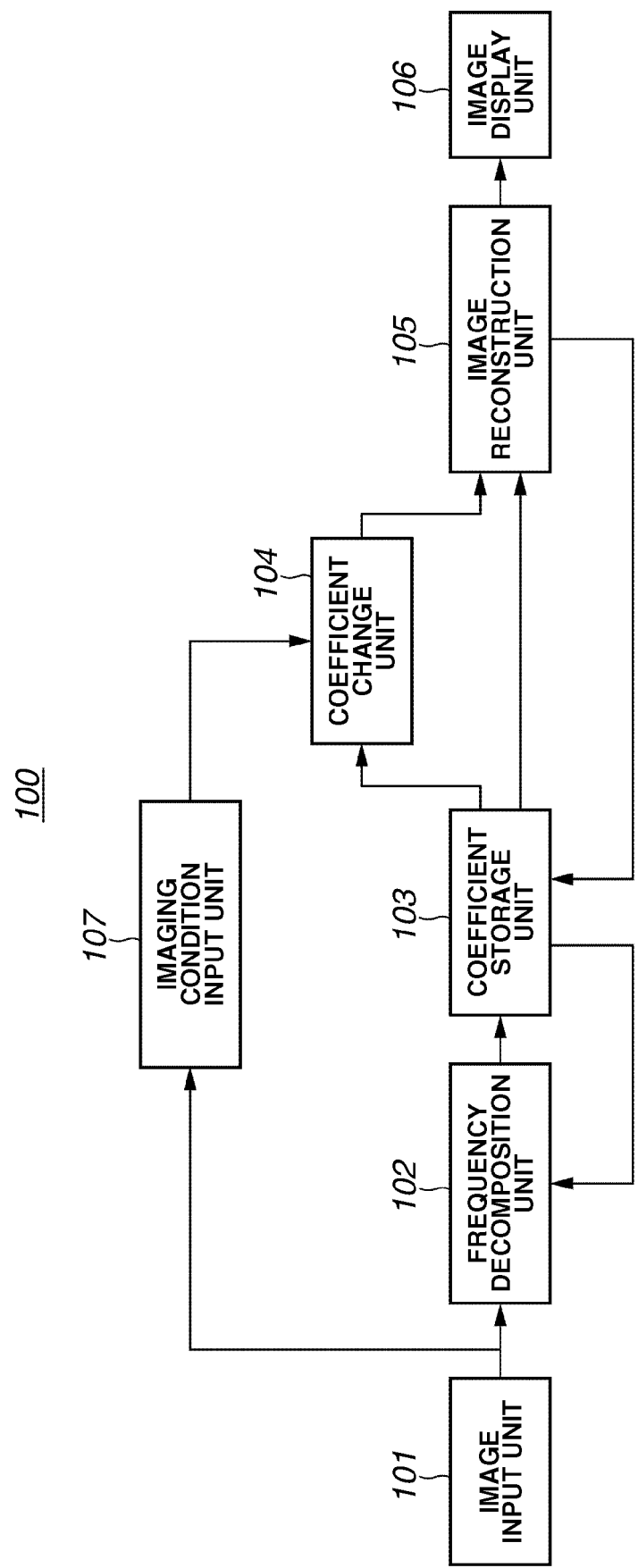
FIG. 1 illustrates a configuration of a decomposition/reconstruction processing unit for performing a Laplacian pyramid decomposition/reconstruction of an image according to an exemplary embodiment of the present invention.

FIG. 1 illustrates a configuration of a decomposition/reconstruction processing unit 100 for performing a Laplacian pyramid decomposition/reconstruction of an image according to an exemplary embodiment of the present invention. As illustrated in FIG. 1, the decomposition/reconstruction processing unit 100 includes an image input unit 101, a frequency decomposition unit 102, a coefficient storage unit 103, a coefficient change unit 104, an image reconstruction unit 105, an image display unit 106, and an imaging condition input unit 107.

The image input unit 101 inputs an image of each frame of an X-ray fluoroscopic image obtained by X-ray fluoroscopic imaging. Hereinafter, a frame to be processed is referred to as a t-th frame (t is a natural number). A frame immediately preceding the t-th frame to be processed is referred to as a (t−1)-th frame. The image input unit 101 inputs also imaging-condition signals representing imaging-conditions for X-ray fluoroscopic imaging and imaging-conditions based on image processing settings.

The imaging condition input unit 107 receives an imaging-condition signal corresponding to the t-th frame image (X-ray fluoroscopic image) from the image input unit 101.

The frequency decomposition unit 102 decomposes a frame image supplied from the image input unit 101 into a plurality of images that differ from one another in frequency band and image size. More specifically, the frequency decomposition unit 102 recursively executes a frequency decomposition of the t-th frame image, which is supplied from the image input unit 101, N times (N is a natural number). Thus, the frequency decomposition unit 102 generates (N+1) coefficient groups respectively corresponding to subband-decomposed images.

Image decomposition executed by the frequency decomposition unit 102 is described below with reference to FIG. 2.

Figure 2:
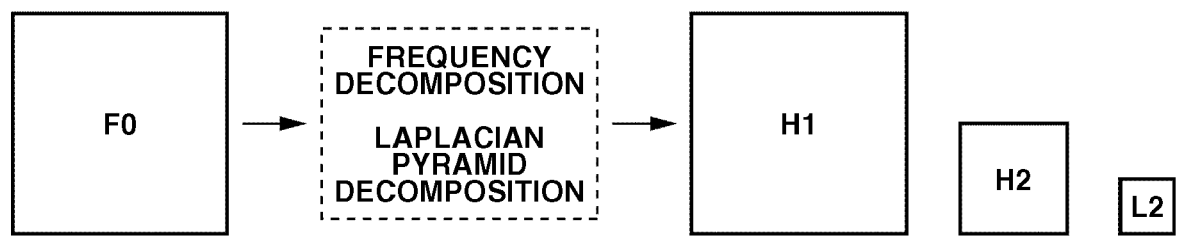
FIG. 2 illustrates the Laplacian Pyramid decomposition according to an exemplary embodiment of the present invention.

As illustrated in FIG. 2, in a first decomposition executed by the frequency decomposition unit 102, an original frame image F0 is decomposed into a first high-frequency sub-image H1, which has the same size as that of the original frame image F0, and a first low-frequency sub-image L1 (not shown), the longitudinal (vertical) size and lateral (horizontal) size of which are half the associated size of the original image. Data respectively corresponding to the high-frequency sub-image H1 and the low-frequency sub-image L1 obtained as a result of the first decomposition are sent to the coefficient storage unit 103 from the frequency decomposition unit 102 as coefficient data. Then, the coefficient data is temporarily stored in the coefficient storage unit 103.

In a second frequency decomposition, the coefficient data corresponding to the first low-frequency sub-image L1 is read from the coefficient storage unit 103. The coefficient data corresponding to the first low-frequency sub-image L1 read therefrom is decomposed into that corresponding to a second high-frequency sub-image H2, which has the same size as that of the first low-frequency sub-image L1, and a second low-frequency sub-image L2, the vertical size and the horizontal size of which are reduced to half the associated size of the image L1. Data respectively corresponding to the second high-frequency sub-image H2 and the second low-frequency sub-image L2 obtained as a result of the second decomposition are sent to the coefficient storage unit 103 from the frequency decomposition unit 102 as coefficient data. Then, the coefficient data is temporarily stored in the coefficient storage unit 103.

The coefficient data stored in the coefficient storage unit 103 is used to reconstruct the original frame image F0.

Reconstruction of the original frame image F0, which is based on the coefficient data stored in the coefficient storage unit 103, is now described.

A reconstruction of the original frame image F0 is performed, similar to a generation of a high-frequency sub-image, which is performed in the above-described frequency decomposition. While a difference between two kinds of images is obtained at the time of generating a high-frequency sub-image, addition of two kinds of images is performed at the time of reconstructing the original frame image F0.

That is, in a first reconstruction, the coefficient data respectively corresponding to the second low-frequency sub-image L2 and the second high-frequency sub-image H2 are read from the coefficient storage unit 103. The image reconstruction unit 105 restores the coefficient data corresponding to the first low-frequency sub-image L1 based on the read coefficient data. Then, the restored coefficient data corresponding to the first low-frequency sub-image L1 is stored in the coefficient storage unit 103. In a second reconstruction, the image reconstruction unit 105 reads the stored coefficient data corresponding to the first low-frequency sub-image L1 and the coefficient data corresponding to the first high-frequency data H1 from the coefficient storage unit 103. Further, the image reconstruction unit 105 restores the original frame image F0 based on the coefficient data read from the coefficient storage unit 103.

In an actual reconstruction of an image, the coefficient change unit 104 changes the coefficient data based on information (e.g., image-processing setting information for sharpening and noise-reduction, and imaging-conditions) supplied from the imaging condition input unit 107. Accordingly, an image actually restored by the image reconstruction unit 105 has the same image size as that of the original frame image F0 but differs slightly from the original frame image F0. Upon completion of reconstruction, the image reconstruction unit 105 outputs the restored image to the image display unit 106, such as a monitor.

Figure 3:
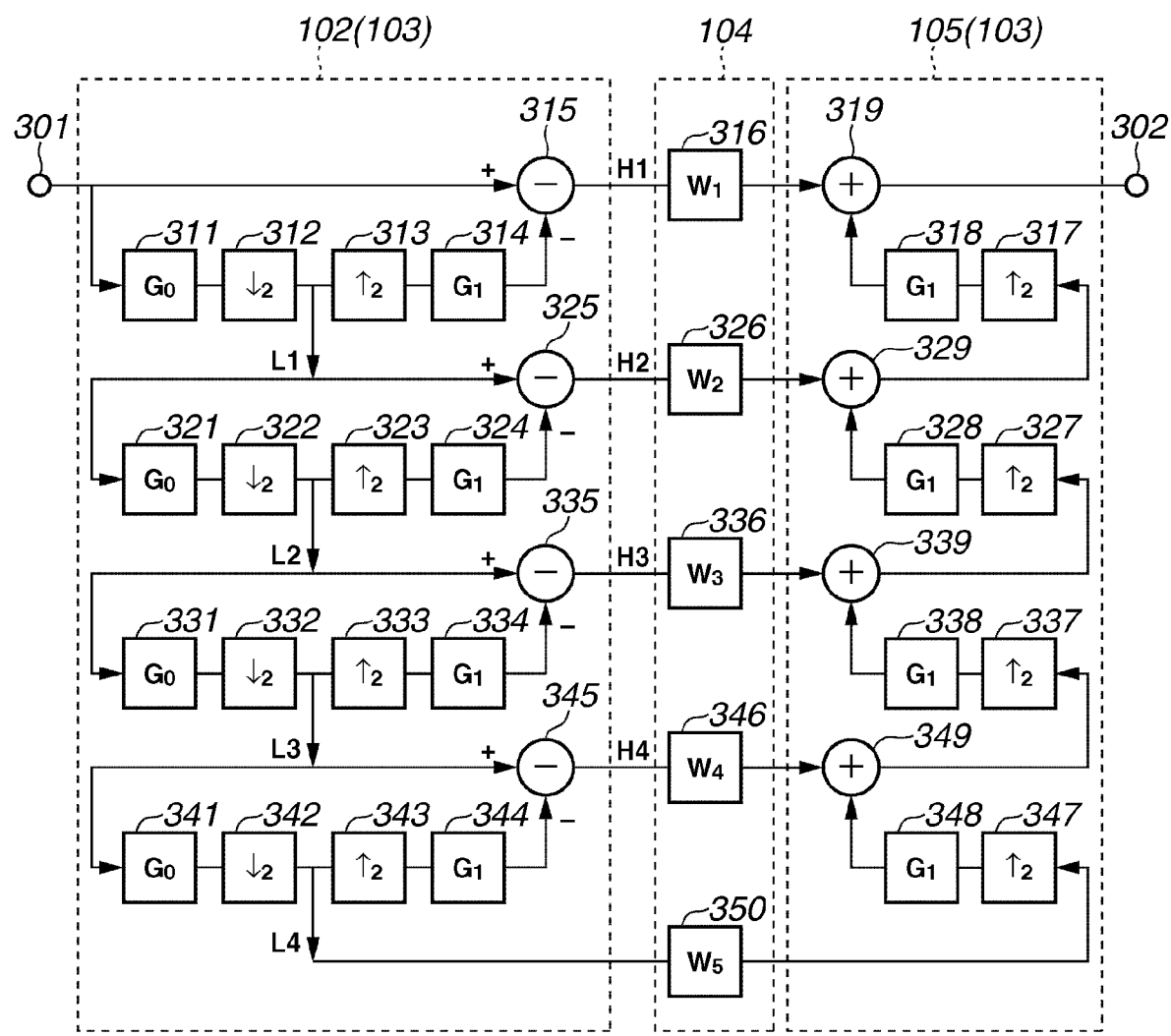
FIG. 3 illustrates an example of a configuration of the decomposition/reconstruction processing unit illustrated in FIG. 1 in more detail.

FIG. 3 illustrates an example of a configuration of the decomposition/reconstruction processing unit 100 in detail.

As illustrated in FIG. 3, the decomposition/reconstruction processing unit 100 includes processing units, i.e., low-pass filters 311, 321, 331, and 341, sub-sampling units 312, 322, 332, and 342, up-sampling units 313, 323, 333, and 343, interpolation processing units 314, 324, 334, and 344, and subtracting units 315, 325, 335, and 345. These processing units implement functions of the frequency decomposition unit 102 and the coefficient storage unit 103 illustrated in FIG. 1.

The decomposition/reconstruction processing unit 100 includes also coefficient change units 316, 326, 336, 346, and 350, which perform weighting on coefficient data and implement functions of the coefficient change unit 104 illustrated in FIG. 1.

The decomposition/reconstruction processing unit 100 includes also up-sampling units 317, 327, 337, and 347, interpolation processing units 318, 328, 338, and 348, and addition units 319, 329, 339, and 349. These processing units implement functions of the image reconstruction unit 105 and the coefficient storage unit 103 illustrated in FIG. 1.

When an image of a t-th frame to be decomposed is input from a terminal 301, the five processing units 311 to 315 execute a first frequency decomposition of this image. More specifically, the low-pass filter 311 extracts a low-frequency component of the input image. Then, the sub-sampling unit 312 generates a reduced image based on the low-frequency component of the input image, which is extracted by the low-pass filter 311, by sub-sampling pixels of the input image to one-half in vertical and horizontal directions.

The reduced-image generated by the sub-sampling unit 312 is the first low-frequency sub-image L1. Then, the first low-frequency sub-image L1 is further decomposed by the processing units 321 to 325 in the next stage. Further, the first low-frequency sub-image L1 is up-sampled by the up-sampling unit 313 to be enlarged to the same size as that of the original input image. Subsequently, the enlarged image is converted by the interpolation processing unit 314 into an image having only the low-frequency component of the original input image which is subtracted by the subtracting unit from the input image. Consequently, the first high-frequency subimage H1 is generated.

The first low-frequency sub-image L1 is further frequency-decomposed by the processing units 321 to 325. Thus, the second high-frequency sub-image H2 and the second low-frequency sub-image L2 are generated, similar to the first high-frequency sub-image H1 and the first low-frequency sub-image L1. When the decomposition/reconstruction processing unit 100 illustrated in FIG. 3 further continues to recursively execute the frequency decomposition of the second low-frequency sub-image L2, the input image is further decomposed into a third high-frequency sub-image H3, a fourth high-frequency sub-image H4, and a fourth low-frequency sub-image L4.

As a result of the frequency decompositions, the four high-frequency sub-images H1, H2, H3, and H4, and the single low-frequency sub-image L4 are obtained. The coefficient change units 316, 326, 336, 346, and 350 perform weighting of the coefficient data corresponding to the sub-images H1 to H4 and L4 based on the image-processing setting information for sharpening and noise-reduction, and the imaging-conditions. Thus, the processing units 317 through 319, 327 through 329, 337 through 339, and 347 through 349 reconstruct image data based on the weighted coefficient data. Consequently, a real-space image is restored.

Assuming that the coefficient data is not changed at all, and that there is no computation error, an image which is the same as the input image can be restored in principle. This is because the processing units for the image reconstruction have a configuration similar to that of a part of the processing units for the frequency decomposition. The configuration of the processing units for image reconstruction differs from the part of the processing units for the frequency decomposition in that the subtraction units 315, 325, 335, and 345 in the configuration of the part of the processing units for frequency decomposition are replaced with the addition units 319, 329, 339, and 349 in the configuration of the processing units for image reconstruction. Thus, an image, which is the same as the input image, can be restored in principle, because each of the addition units adds data, which is the same as data subtracted by an associated subtraction unit from minuend data, to the minuend data.

Coefficient data corresponding to the fourth low-frequency sub-image L4, the vertical size and the horizontal size of which are (1/16) the associated size of the input image, is weighted by the coefficient change unit 350. Then, the up-sampling unit 347 enlarges the fourth low-frequency sub-image L4 to an image, the vertical size and the lateral size of which are (1/8) the associated size of the input image. Subsequently, an interpolation image having the same size as that of the enlarged image is generated by the interpolation processing unit 348. When the addition unit 349 adds the interpolation image generated by the interpolation processing unit 348 and the fourth high-frequency sub-image H4', the coefficient data corresponding to which is weighted by the coefficient change unit 346, a sub-image (decomposed image), the vertical size and the horizontal size of which are (1/8) the associated size of the input image, is restored.

Similarly, the processing units 337 through 339, 327 through 329, and 317 through 319 recursively perform up-sampling and subsequent processing. Thus, a sub-image, the vertical size and the horizontal size of which are (1/4) the associated size of the input image, a sub-image, the vertical size and the horizontal size of which are half the associated size of the input image, and an image, whose size is equal to that of the input image, are sequentially restored. The restored image, whose size is equal to that of the image input from the terminal 301, is obtained by the addition unit 319 and is output through a terminal 302 to an external monitor or the like.

In the foregoing description, for simplicity of description, the delay time due to each processing iteration has not been taken into consideration. However, there are two kinds of processing which causes a delay time that should be taken into consideration. One is the interpolation processing. Not only data of one line but data of the next line is required to perform a vertical interpolation. Thus, it is necessary to delay a start time of the interpolation processing in order to wait for the required data of the next line. Accordingly, a time when a result of the interpolation processing is obtained, is delayed.

The other is sequential processing of processes to be performed in component units, such as the frequency decomposition unit 102 and the image reconstruction unit 105, of the decomposition/reconstruction unit 100. This sequential processing causes a delay. The amount of data to be processed in the respective component units of the decomposition/reconstruction unit 100 differ from one another according to an image size. In a case where the component units process data in parallel with one another, efficiency of processing in the component unit, which processes a relatively small amount of data, is very low. Therefore, sequential processing of the processes is required. In addition, where data of images corresponding to various respective decomposition levels are stored in one mass storage unit, such sequential processing results in higher efficiency.

Figure 4:
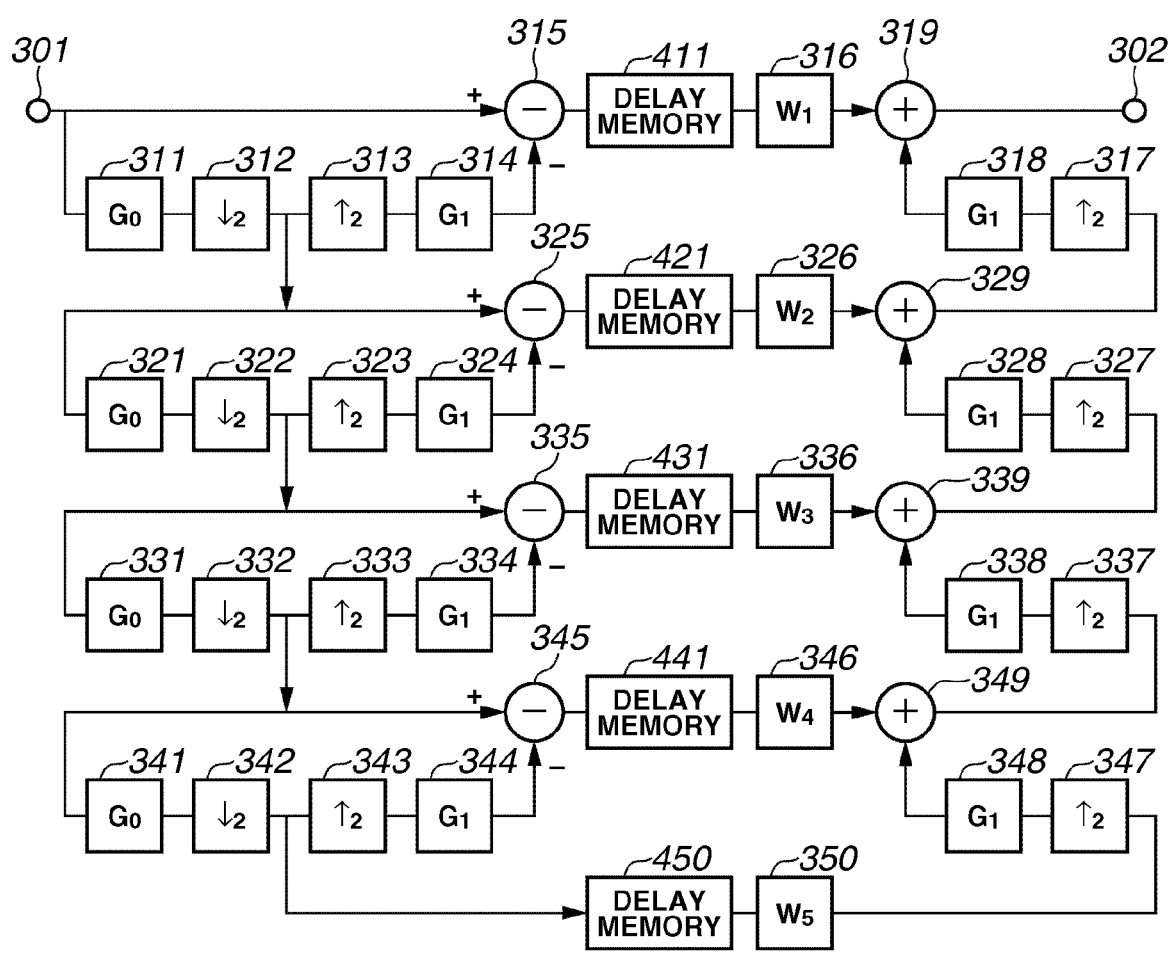
FIG. 4 illustrates an example of a configuration of the decomposition/reconstruction processing unit constructed in consideration of a delay for reconstruction processing.

As described above, time-delays occur at various places in implementing decomposition/reconstruction of images described with reference to FIGS. 1 to 3. Thus, delay memories for adjusting processing timing are required. FIG. 4 illustrates delay memories needed for reconstruction of an image in the decomposition/reconstruction processing unit 100 illustrated in FIG. 3. In FIG. 4, a component having the same function as that of an associated one of the components illustrated in FIG. 3 is designated with the same reference numeral as the associated component illustrated in FIG. 3.

The delay memories 411, 421, 431, 441, and 450 are provided at dispersed locations in the decomposition/reconstruction processing unit illustrated in FIG. 4. However, each delay memory needs to temporarily store high-frequency sub-images and low-frequency sub-images obtained by decomposition processing. Thus, in a case where the separate delay memories are provided in the decomposition/reconstruction processing unit, efficiency of use of the delay memories is low. Accordingly, from the standpoint of cost, an integrated single memory can be used to implement the functions of the delay memories 411, 421, 431, 441, and 450. The components other than the delay memories 411, 421, 431, 441, and 450 are the same as the associated components illustrated in FIG. 3.

For example, in the case where the functions of the delay memories 411, 421, 431, 441, and 450 are implemented by one integrated memory, a very large amount of access to the integrated memory is made. If various functions are added to the multi-resolution analysis function, an amount of access to the integrated memory is further increased. In a case where an amount of memory access is too much increased, the size of an image to be processed needs to be reduced to limit the total amount of memory access in the entire decomposition/reconstruction processing unit within a predetermined amount.

A technique for noise reduction, which can be utilized in the above-described decomposition/reconstruction of an image by weighting coefficient data in the coefficient change unit 104, is spatial smoothing that is likely to dull a sharp edge. Temporal smoothing cannot be utilized in the above-described decomposition/reconstruction. A noise reduction technique for smoothing in a time direction is inter-frame noise reduction utilizing correlation between frames. However, in a case where the functions of the delay memory are implemented by one integrated memory in the above-described decomposition/reconstruction unit, and where the inter-frame noise reduction processing function is simply added to the multi-resolution analysis function, a total amount of memory access in the entire decomposition/reconstruction processing unit is dramatically increased, as above-described. Moreover, image data delayed by at least 1 frame is required to implement the inter-frame noise reduction. Thus, a frame memory for storing image data is needed. Consequently, the necessary memory capacity is increased.

First Exemplary Embodiment

An image processing apparatus according to a first exemplary embodiment of the present invention can prevent an increase in the amount of memory access in the entire apparatus so as to avoid reducing the size of an image to be processed, even in a case where an inter-frame noise reduction function is added to the above-described multi-resolution analysis function.

Figure 5:
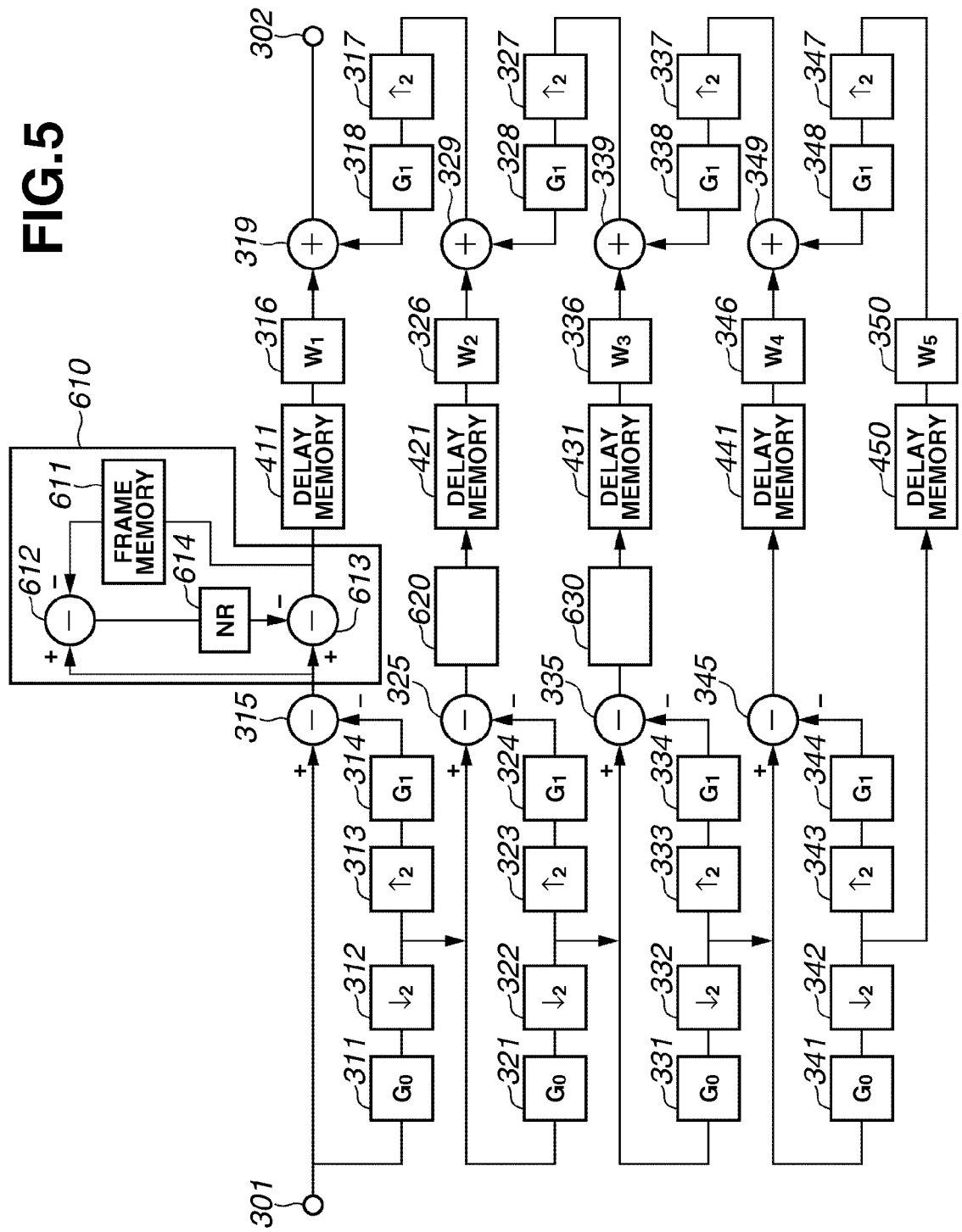
FIG. 5 illustrates an example of a configuration of the decomposition/reconstruction processing unit to which an inter-frame noise reduction processing function is added.

In a case where inter-frame noise reduction processing is performed on a plurality of high-frequency sub-images obtained by frequency decomposition in the decomposition/reconstruction processing unit illustrated in FIG. 4, two configurations of the decomposition/reconstruction processing unit can be considered. One is a configuration in which the inter-frame noise reduction processing is performed at a preceding stage of a delay memory. The other is a configuration in which the inter-frame noise reduction processing is performed at a subsequent stage of a delay memory. FIG. 5 illustrates the former configuration in which the inter-frame noise reduction processing is performed at a preceding stage side of (or at a stage just anterior to) a delay memory.

That is, FIG. 5 illustrates an example of the configuration of the decomposition/reconstruction processing unit obtained by adding the inter-frame noise reduction function to the decomposition/reconstruction processing unit illustrated in FIG. 4. Inter-frame noise reduction units 610, 620, and 630 illustrated in FIG. 5 smooth a plurality of high-frequency sub-images, which are obtained by frequency decomposition, in a time direction to reduce noise utilizing correlation between frames. The noise reduction unit 610 includes a frame memory 611, subtraction units 612 and 613, and a non-linear processing unit 614. Although not illustrated in FIG. 5, each of the noise reduction units 620 and 630 includes a frame memory, two subtraction units, and a non-linear processing unit, similar to the inter-frame noise reduction unit 610.

Decomposition/reconstruction processing of an image, which is performed in the decomposition/reconstruction processing unit illustrated in FIG. 5, is similar to that performed in the above-described decomposition/reconstruction processing unit illustrated in FIGS. 1 to 4. Thus, a description of the decomposition/reconstruction processing performed in the decomposition/reconstruction processing unit illustrated in FIG. 5 is omitted. Hereinafter, the inter-frame noise reduction processing is described.

A noise-reduced image of 1 frame, in which noise is reduced, is stored in the frame memory 611 in each of the inter-frame noise reduction units 610, 620, and 630. After lapse of a 1-frame period, the stored image of 1 frame is read. Then, a signal representing the read image is supplied to the subtraction unit 612 as a reference image signal representing a reference image. A signal representing image data output from the subtraction unit 315 is input to the subtraction unit 612 as a noise reduction target image signal. The noise reduction target image is input also to the subtraction unit 613, in addition to the subtraction unit 612.

The subtraction unit 612 generates an inter-frame difference signal by subtracting the reference image signal (recursive-filter image signal), which is supplied from the frame memory 611, from the noise reduction target image signal supplied from the subtraction unit 315. Information represented by the generated inter-frame difference signal contains information representing a noise component, which is randomly generated, and a difference (referred to as a movement component) generated due to a level change that is caused by movement of an imaging object.

The non-linear processing unit 614 executes non-linear processing, such as what is called a limiter arithmetic-operation, to remove the movement component from the inter-frame difference signal generated by the subtraction unit 612 and to extract only the noise component. Although only adjustment of a limit level can be achieved utilizing the limiter arithmetic-operation, nonlinear processing, which enables fine adjustment for noise reduction, can be executed using a look-up table unit as a nonlinear processing unit.

The subtraction unit 613 subtracts the noise component extracted by the nonlinear processing unit 614 from the noise reduction target image signal supplied from the subtraction unit 315. Thus, the subtraction unit 613 generates a high-frequency sub-image having reduced noise. The subtraction unit 613 writes the generated high-frequency sub-image to the delay memory 401 and back to the frame memory 611.

The decomposition/reconstruction processing unit illustrated in FIG. 5 requires that the inter-frame noise reduction units 610, 620, and 630 write the high-frequency sub-image, from which noise has been reduced, at each resolution back to the frame memory and also to the delay memory. That is, the decomposition/reconstruction processing unit illustrated in FIG. 5 writes the same image to both the frame memory and the delay memory. Consequently, necessary memory capacity is increased. In addition, the amount of memory access is increased.

Figure 6:
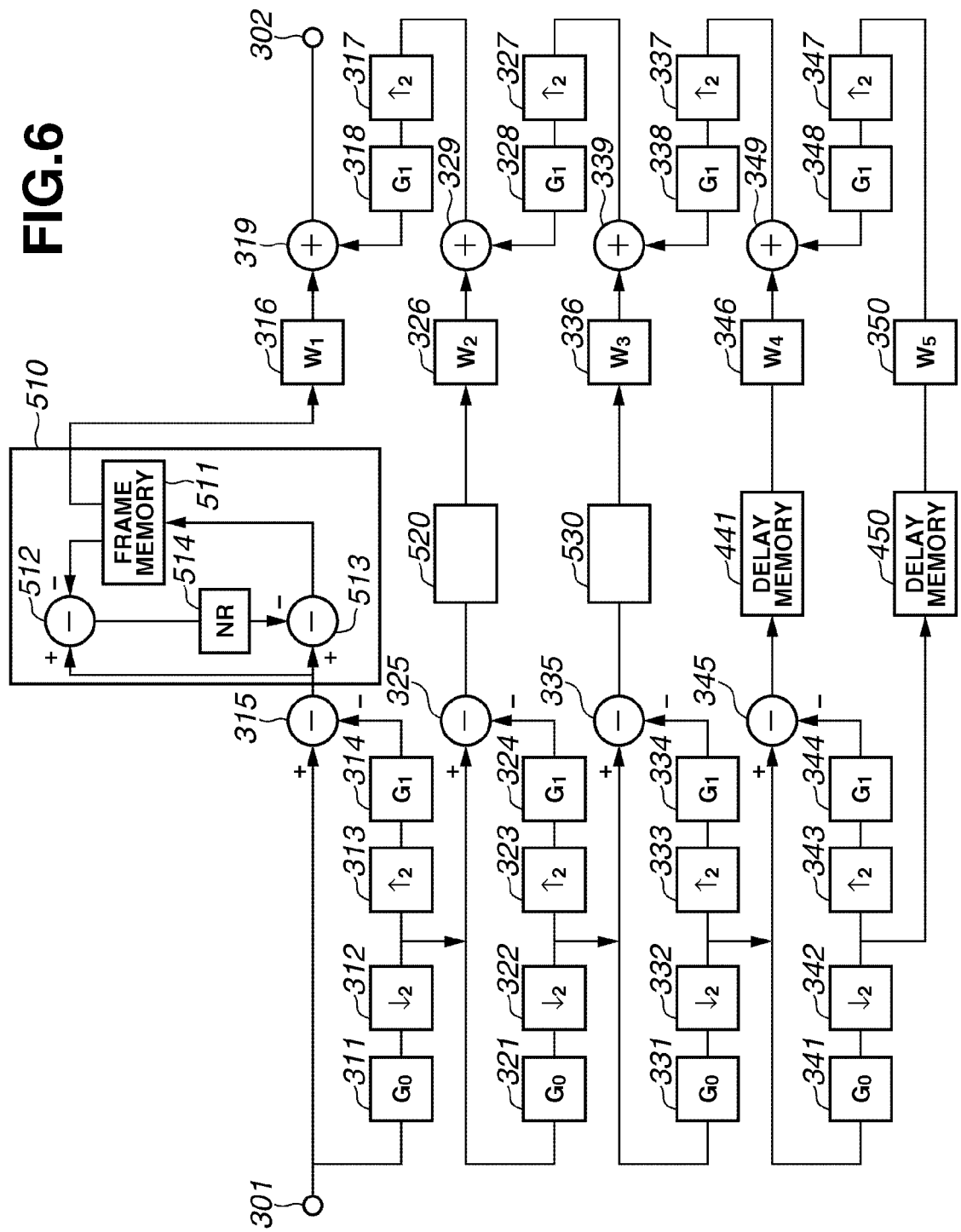
FIG. 6 illustrates a configuration of an image processing apparatus according to a first exemplary embodiment of the present invention.

Thus, the image processing apparatus according to the first exemplary embodiment is configured as illustrated in FIG. 6, so as to prevent an amount of memory access from increasing due to the addition of the inter-frame noise reduction function to the multi-resolution analysis function. More specifically, the image processing apparatus illustrated in FIG. 6 is provided with a port from which data having been written to the frame memory in each of the inter-frame noise reduction units 510, 520, and 530 is read after a delay of between zero and one frame period. Data is read from this port corresponding to each of the inter-frame noise reduction units 510, 520, and 530 with a delay time that is equal to a delay time corresponding to an associated one of the delay memories in the inter-frame noise reduction units 510, 520, and 530.

FIG. 6 illustrates a configuration of the image processing apparatus according to the first exemplary embodiment of the present invention. The image processing apparatus according to the first exemplary embodiment has the multi-resolution analysis function and the inter-frame noise reduction function. In FIG. 6, each component, which has the same function as the component illustrated in FIGS. 1 to 5, is designated with the same reference numeral used to denote the component illustrated in FIGS. 1 to 5 having the same function. A description of such a component is not repeated.

The inter-frame noise reduction units 510, 520, and 530 for smoothing a plurality of high-frequency sub-images obtained by frequency decomposition, which are illustrated in FIG. 6, reduce noise by utilizing correlation between frames. The inter-frame noise reduction unit 510 includes a frame memory 511, subtraction units 512 and 513, and a nonlinear processing unit 514. Although not illustrated in FIG. 6, the inter-frame noise reduction units 520 and 530 are configured in the same way as the inter-frame noise reduction unit 510.

Decomposition/reconstruction processing of an image, which is performed in the image processing apparatus according to the first exemplary embodiment illustrated in FIG. 6, is similar to the above-described decomposition/reconstruction processing. Thus, a description of the decomposition/reconstruction processing according to the first exemplary embodiment illustrated in FIG. 6 is omitted.

Coefficient data corresponding to an image, in which noise is reduced, is stored in the frame memory 511 in each of the inter-frame noise reduction units 510, 520, and 530. The coefficient data corresponding to such an image stored in the frame memory 511 in the inter-frame noise reduction units 510, 520, and 530 is read after lapse of a 1-frame period. A signal representing the read coefficient data is supplied to the subtraction unit 512 as a reference image signal to be used in the noise reduction processing. A signal representing image data output from the subtraction unit 315 is input to the subtraction unit 512 as a noise reduction target image signal. This noise reduction target image signal is input also to the subtraction unit 513, in addition to the subtraction unit 512.

The coefficient data stored in the frame memory 511 of the inter-frame noise reduction units 510, 520, and 530 is read therefrom after a delay of between zero and one frame period, and is then supplied to an associated one of the coefficient change units 316, 326, and 336. That is, the coefficient data stored in each of the frame memories is read after lapse of a delay time that is less than a 1-frame period (i.e., after delayed by a time that is less than a 1-frame period). Then, the read coefficient data is supplied to an associated one of the coefficient change units 316, 326, and 336. More particularly, the coefficient data stored in the frame memory illustrated in FIGS. 4 and 5 of the inter-frame noise reduction units 510, 520, and 530 is read with a delay time which is equal to that of the delay memories respectively corresponding to the inter-frame noise reduction units 510, 520, and 530.

The subtraction unit 512 generates an inter-frame difference signal by subtracting a reference difference signal, which is supplied from the frame memory 511, from a noise reduction target image signal supplied from the subtraction unit 315. As described above, the generated inter-frame difference signal contains information representing a noise component, which is randomly generated, and a difference (referred to as a movement component) generated due to a level change that is caused by movement of an imaging object.

The nonlinear processing unit 514 extracts only the noise component by removing the movement component from the inter-frame difference signal generated by the subtraction unit 512. The subtraction unit 513 generates a noise-reduced high-frequency sub-image, in which noise has been reduced, by subtracting the noise component, which has been extracted by the nonlinear processing unit 514, from a noise reduction target image signal supplied from the subtraction unit 315. The subtraction unit 513 writes the generated high-frequency sub-image, in which noise has been reduced, back to the frame memory 511.

Thus, at a decomposition level (frequency band) to which both of the inter-frame noise reduction unit and the delay memory are applied, data stored in the frame memory is read after a delay of between zero and one frame period. Then, the read data is used as delay data. Consequently, as is apparent when compared with the unit of the configuration illustrated in FIG. 5, processing can be performed without providing the delay memory in the decomposition/reconstruction processing unit at the decomposition level, to which both of the inter-frame noise reduction unit and the delay memory are applied. That is, it is sufficient to provide only one of the frame memory and the delay memory in the processing unit for each of a plurality of sub-images decomposed by the frequency decomposition unit.

With respect to one frame memory, coefficient data to be stored in this frame memory is updated in cycles of a 1-frame period. On the other hand, image data is used in reconstruction in cycles of a frame period (at a timing within each cycle that is less than a 1-frame period) in a different phase. A delay amount of each delay memory corresponds to a difference in phase between a moment, at which inter-frame noise reduction processing is executed, and a moment at which reconstruction processing is executed.

As described above, according to the present embodiment, the decomposition/reconstruction processing unit is provided with frame memories which can output data written thereto after lapse of a delay time that is a 1-frame period and even after lapse of a delay time that is less than a 1-frame period. In a case where inter-frame noise reduction processing is performed on a part or all of a plurality of sub-images obtained by decomposition in multi-resolution analysis, the decomposition/reconstruction processing unit is provided only with frame memories and data stored in the frame memories are shared by both of noise reduction processing and reconstruction processing at decomposition levels. Consequently, even in a case where inter-frame noise reduction processing is performed on images of frames constituting a moving image in addition to multi-resolution analysis processing, memory capacity required to execute the processing and the amount of memory access can be prevented from increasing.

Signals respectively included in the four high-frequency sub-images H1, H2, H3, and H4, which are obtained in a case where the number of decompositions is 4, differ from one another in frequency band, and magnitudes of a noise component and a movement component, and the ratios between them are different. The magnitude of the noise components depends largely upon a signal source (image sensor) of images. Therefore, it is desirable to control a degree of noise reduction in each frequency band according to the signal source. For example, in a case where processing to be executed in the nonlinear processing unit is a limiter arithmetic-operation, it is useful to set a limit level corresponding to noise reduction processing at each decomposition level.

Second Exemplary Embodiment

An image processing apparatus according to a second exemplary embodiment of the present invention sequentially executes a plurality of decompositions, difference image generation, noise reduction, and image reconstruction using only one common sequence of processing units. Consequently, the configuration of an image processing apparatus according to the present invention can be simplified, while implementing functions similar to those of the first embodiment of the present invention.

In a case where a processing unit dedicated to each element of necessary processing is provided in an image processing apparatus, similar to the first embodiment, the necessary processing can be executed at high speed. In addition, the entire apparatus can be simply controlled. However, at every decomposition of an image into a high-frequency sub-image and a low-frequency sub-image, an image size in vertical and horizontal directions of the low-frequency sub-image is reduced to half the size. Thus, an amount of image data of the low-frequency sub-image is reduced to (¼). Consequently, the larger the number of decompositions to be performed in a processing unit that processes a low-frequency sub-image, the longer the idle time of this processing unit. Accordingly, a waste of the processing units occurs.

Figure 7:
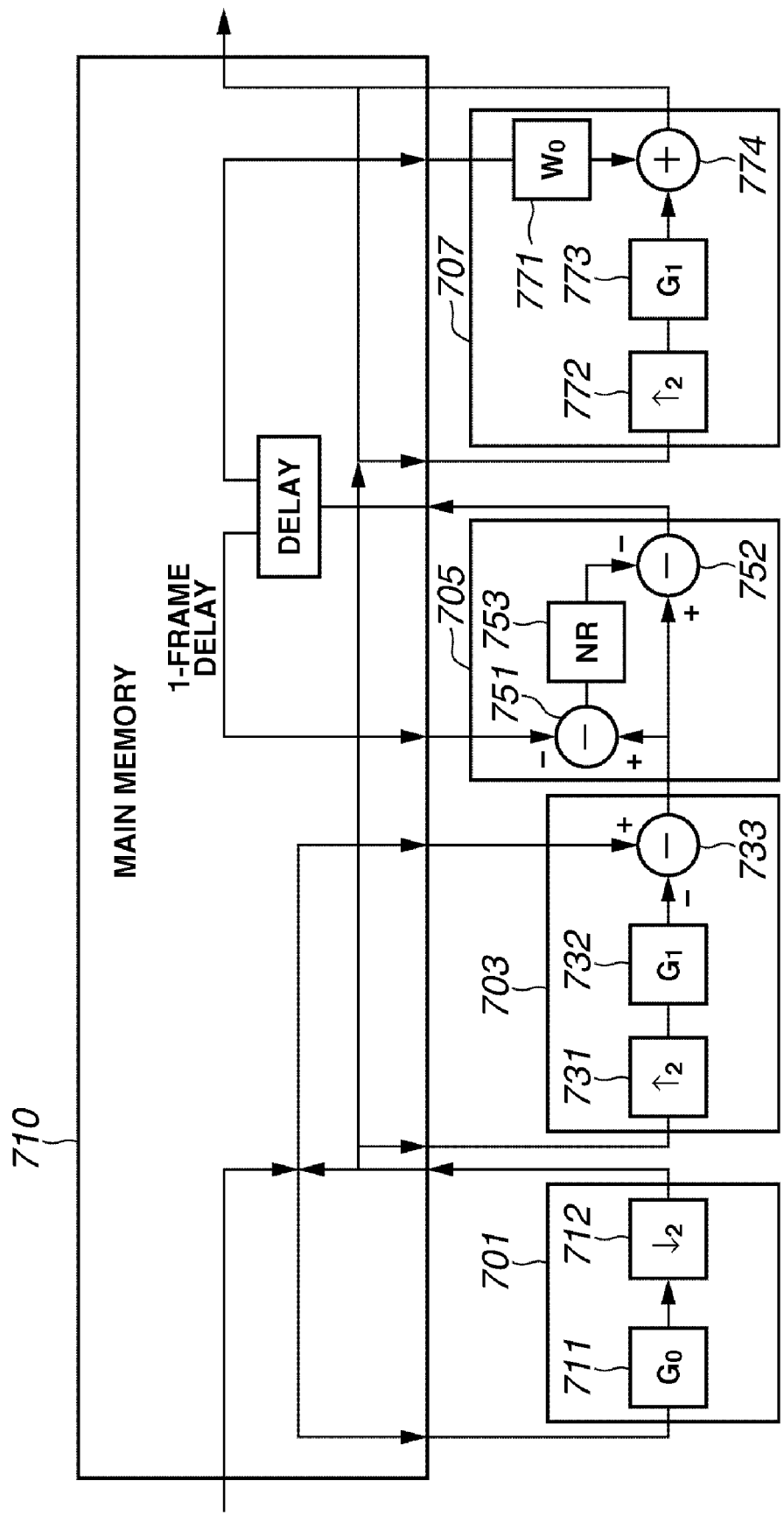
FIG. 7 illustrates a configuration of an image processing apparatus according to a second exemplary embodiment of the present invention.

Thus, the image processing unit according to the second exemplary embodiment effectively shares a single sequence of processing units among the above-described processing, and processes all of an original un-decomposed image and composed sub-images through a single sequence of processing units. FIG. 7 illustrates a configuration of the image processing apparatus according to the second exemplary embodiment of the present invention.

As illustrated in FIG. 7, the image processing apparatus according to the second exemplary embodiment includes a sequence of processing units for executing the above-described four kinds of processing, i.e., a reduced image generation processing unit 701, a difference image generation processing unit 703, a noise reduction unit 705, a reconstruction unit 707, and a main memory 710. In this embodiment, the decomposition processing is accomplished by dividing the processing into reduced image generation processing and difference image generation processing.

The reduced image generation processing unit 701 includes a low-pass filter 711 for extracting a low-frequency component of an image, and a sub-sampling unit 712 for generating a reduced image, the vertical size and the horizontal size of which are reduced to half the associated size of the image, based on the low-frequency component extracted by the low-pass filter 711. The difference image generation processing unit 703 includes an up-sampling unit 731 for up-sampling to enlarge a sub-image to an original image size, an interpolation unit 732 for converting an image into a sub-image having only a low-frequency component, and a subtraction unit 733.

The noise reduction unit 705 includes subtraction units 751 and 752, and a nonlinear processing unit 753 for removing a movement component and extracting a noise component from an inter-frame difference signal. The reconstruction unit 707 includes a coefficient change unit 771 for weighting coefficient data based on image processing setting information and imaging conditions, an up-sampling unit 772 for up-sampling a sub-image, an interpolation unit 773 for converting an image into a sub-image having only a low-frequency component, and an addition unit 774.

Processing to be performed by each of the processing units 701, 703, 705, and 707 differs from the processing according to the first exemplary embodiment only in that the decomposition processing is divided into the reduced image generation processing and the difference image generation processing. Thus, the processing to be performed by the processing units 701, 703, 705, and 707 is similar to the processing according to the first exemplary embodiment. Therefore, a description of the processing to be performed by the processing units 701, 703, 705, and 707 is omitted.

Hereinafter, a processing procedure in the image processing apparatus according to the second exemplary embodiment is described with reference to a timing chart illustrated in FIG. 8.

Figure 8:
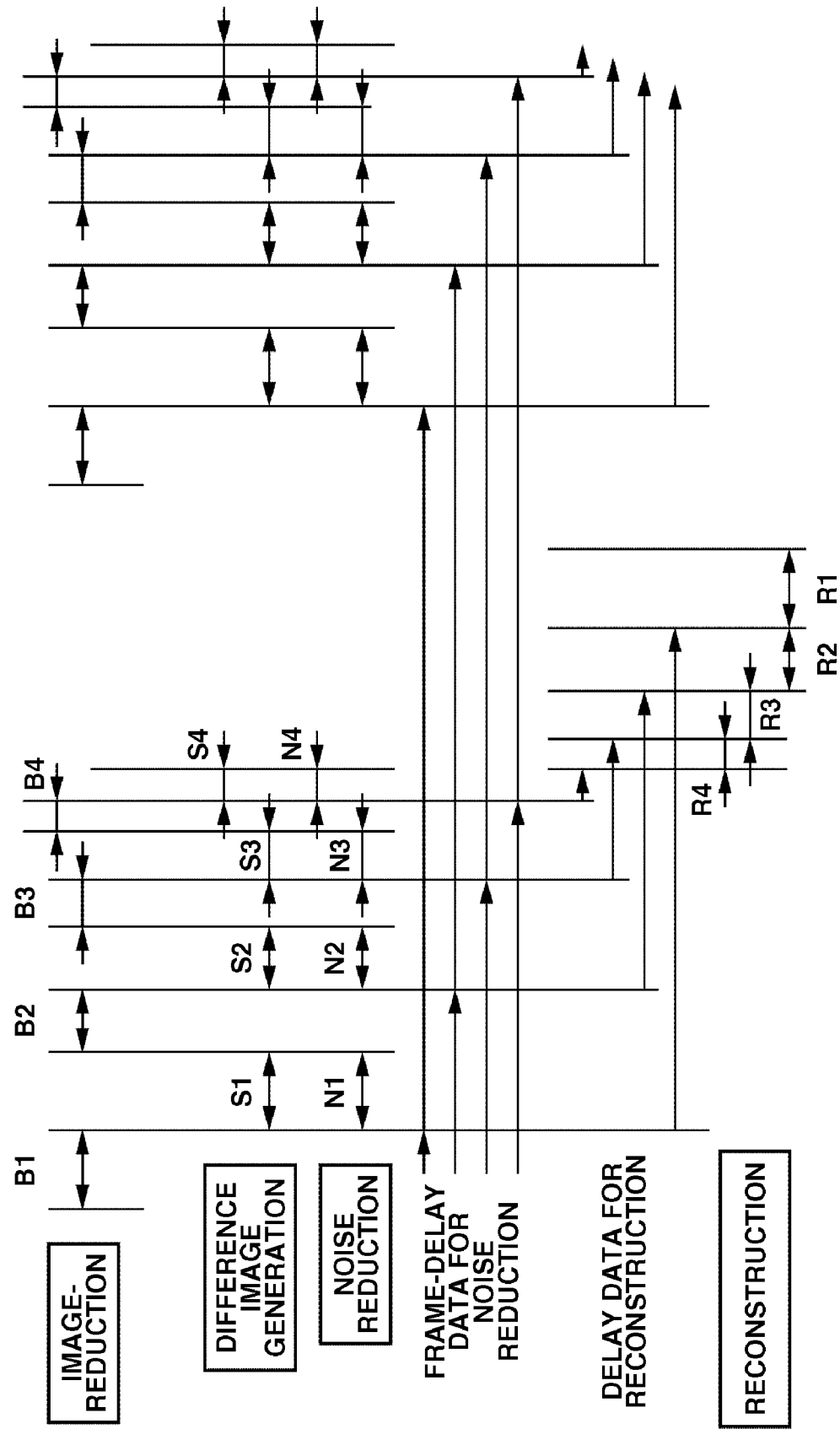
FIG. 8 illustrates a timing chart schematically showing a processing procedure in the image processing apparatus according to the second exemplary embodiment of the present invention.

FIG. 8 illustrates a timing chart schematically showing a processing procedure in the image processing apparatus according to the second exemplary embodiment of the present invention. More particularly, FIG. 8 illustrates timing of four kinds of processing (the reduced image generation, the difference image generation, the noise reduction, and the image reconstruction), which are designated by rectangular frames, and timing of two kinds of delay data (noise reduction frame delay data and image reconstruction delay data). In the present embodiment, the number of decompositions in the multi-resolution analysis is 4, by way of example. However, the timing of processing and delay data and the number of decompositions according to the present invention are not limited thereto.

For description of an inter-frame relationship of the reduced image generation processing, the difference image generation processing, and the noise reduction processing among the four kinds of processing, FIG. 8 illustrates timing of three kinds of processing performed over two frames. For convenience of drawing, in FIG. 8, a ratio of processing time of the three processing is suitably compressed. For example, a ratio between amounts of data to be processed at a first reduced image generation and at a second reduced image generation is 4:1. However, FIG. 8 illustrates the first reduced image generation and the second reduced image generation with a ratio which differs from 4:1.

First, it is assumed that a frame image of each frame to be processed is already stored in the main memory 710.

The reduced image generation unit 701 executes image reduction processing of a frame image, which is to be processed, four times. The reduced image generation unit 701 executes a first reduced image generation in first image size reduction processing B1. More particularly, the reduced image generation unit 701 executes an i-th reduced image generation in i-th image size reduction processing B1 (suffix i=1, 2, 3, 4 in this case). Data representing a result of image size reduction processing is stored in the main memory 710 at every image size reduction. In a case where the stored data is used in the next image size reduction or the noise reduction, the stored data is read from the main memory 710.

Immediately following the i-th image size reduction processing Bi, the difference image generation processing unit 703 executes difference image generation processing Si using a result of i-th image size reduction. The noise reduction processing unit 705 simultaneously executes inter-frame noise reduction processing Ni using pixel data of a difference image generated in the difference image generation processing Si. At that time, the noise reduction processing unit 705 reads pixel data of an image, which is obtained by noise reduction in an immediately precedent frame, from the main memory 710.

In the inter-frame noise reduction processing Ni, the noise reduction processing unit 705 calculates a difference between pixel data of a difference image generated in the difference image generation processing Si and pixel data read from the main memory 710. Subsequently, the noise reduction processing unit 705 extracts a noise component from the inter-frame difference signal that is obtained by calculating the difference. Then, the noise reduction processing unit 705 subtracts the extracted noise component from the difference image generated by the difference image generation processing Si to obtain pixel data of an image having undergone the inter-frame noise reduction processing. The obtained pixel data is stored in the main memory 710 and is used in image reconstruction processing to be performed after a predetermined delay time. The obtained pixel data is also used in noise reduction processing to be performed after lapse of a 1-frame period.

In the example illustrated in FIG. 8, the image size reduction processing, the difference image generation processing, and the noise reduction processing are alternately repeated until the fourth image size reduction processing is completed. As is apparent from the timing chart in FIG. 8, a set of the difference image generation processing S1 and the noise reduction processing N1 follows the image size reduction processing B1. Subsequently, the image size reduction processing Bi and a set of the difference image generation processing Si and the noise reduction processing Ni are alternately executed in the order of the suffix "i" (i=1, 2, 3, 4).

Upon completion of such processing (a set of the processing S4 and the processing N4), coefficient data respectively corresponding to four high-frequency sub-images H1, H2, H3, and H4, which have undergone the noise reduction processing, and one low-frequency sub-image L4 are stored in the main memory 710.

Next, image reconstruction processing corresponding to the four decompositions is executed using the coefficient data respectively corresponding to the four high-frequency sub-images H1, H2, H3, and H4, which have undergone the noise reduction processing, and the one low-frequency sub-image L4 are stored in the main memory 710. The reconstruction processing unit 707 performs up-sampling and interpolation on the low-frequency sub-image L4 whose image size is smallest among the sub-images H1, H2, H3, and H4, and the one low-frequency sub-image L4. Subsequently, the reconstruction processing unit 707 reconstructs a low-frequency sub-image L3' by adding a result of the up-sampling and interpolation to the high-frequency sub-image H4, the vertical and horizontal sizes of which are twice the associated size of the sub-image L4, in reconstruction processing R4. At that time, coefficient data corresponding to the high-frequency sub-image H4 is weighted based on the image processing setting information and the imaging conditions. Coefficient data corresponding to the reconstructed image is once stored in the main memory 710 and is used in a stage of the next reconstruction.

Subsequently, the reconstruction processing unit 707 similarly reconstructs a low-frequency sub-image L(j−1)' from a high-frequency sub-image Hj and a low-frequency sub-image Lj in reconstruction processing Rj (a suffix j=3, 2, 1). Then, when reconstructing a low-frequency sub-image L0' (frame image having an image size of the original input image) by the reconstruction processing unit 707 is finished, the decomposition/reconstruction processing of an image of 1 frame is completed.

Thus, according to the second exemplary embodiment, memory capacity required to execute the processing and an amount of memory access can be prevented from increasing even in a case where the image processing apparatus executes the multi-resolution analysis processing and the inter-frame noise reduction processing of a frame image constituting a moving image, similar to the first exemplary embodiment. In addition, the configuration and the size of the image processing apparatus can be reduced by using only one set of processing units and by sequentially performing the reduced image generation processing, the difference image generation processing, the noise reduction processing, and the image reconstruction processing a plurality of times.

The image processing apparatus according to the second exemplary embodiment executes the above-described set of the reduced image processing, the difference image generation processing, and the noise reduction processing, and the associated image reconstruction processing four times within a 1-frame period. Although the image processing apparatus executes the set of the processing four times, an amount of data to be processed is reduced to (¼) at every image size reduction. Accordingly, a total amount of data to be processed is about (4/5) the amount of data of the original input image. Thus, it is useful for the image processing apparatus to process the data faster for that.

According to the above-described second exemplary embodiment, processing time of the reduced image generation, the difference image generation and the noise reduction is allotted separately. However, the reduced image generation processing, the difference image generation processing, and the noise reduction processing can be executed in parallel to one another. Alternatively, the reduced image generation processing, the difference image generation processing, and the noise reduction processing can be executed as follows. First, the reduced image generation processing is executed four times. Subsequently, the set of the difference image generation processing and the noise reduction processing is executed four times.

Third Exemplary Embodiment

Figure 9:
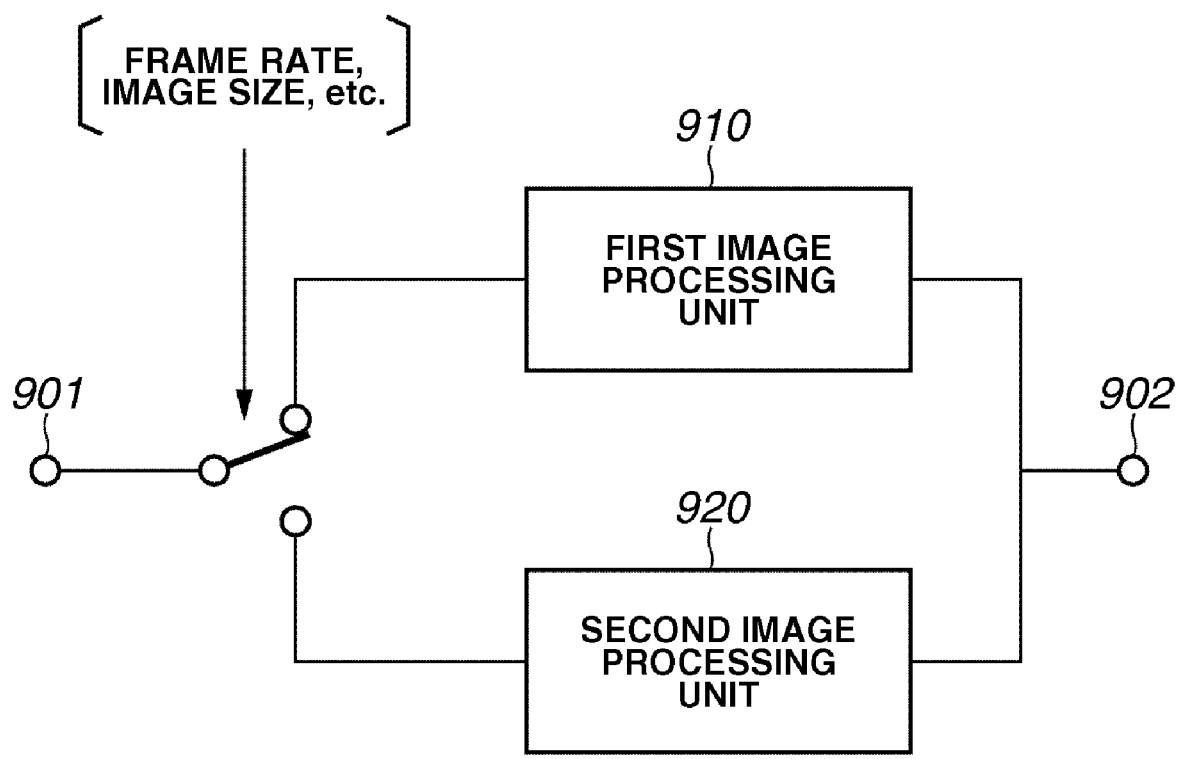
FIG. 9 illustrates a configuration of an image processing apparatus according to a third exemplary embodiment of the present invention.

FIG. 9 illustrates a configuration of an image processing apparatus according to a third exemplary embodiment of the present invention. The image processing apparatus according to the third exemplary embodiment includes a first image processing unit 910 and a second image processing unit 920.

The first image processing unit 910 can perform the multi-resolution analysis processing and the inter-frame noise reduction processing on images so as to prevent the amount of memory access from increasing, as described above. The first image processing unit 910 is configured, for example, as illustrated in FIG. 6. The second image processing unit 920 is adapted to simply perform the multi-resolution analysis processing and the inter-frame noise reduction processing on images without increasing an amount of memory access. The second image processing unit 920 is configured, for example, as illustrated in FIG. 10.

In the third exemplary embodiment, the image processing unit is selectively changed between the image processing units 910 and 920 according to, e.g., a frame rate of an input moving image and an image size of a target area to be processed. A frame image input from a terminal 901 is appropriately processed by the image processing units 910 and 920. A result of processing the input frame image is output from a terminal 902.

Figure 10:
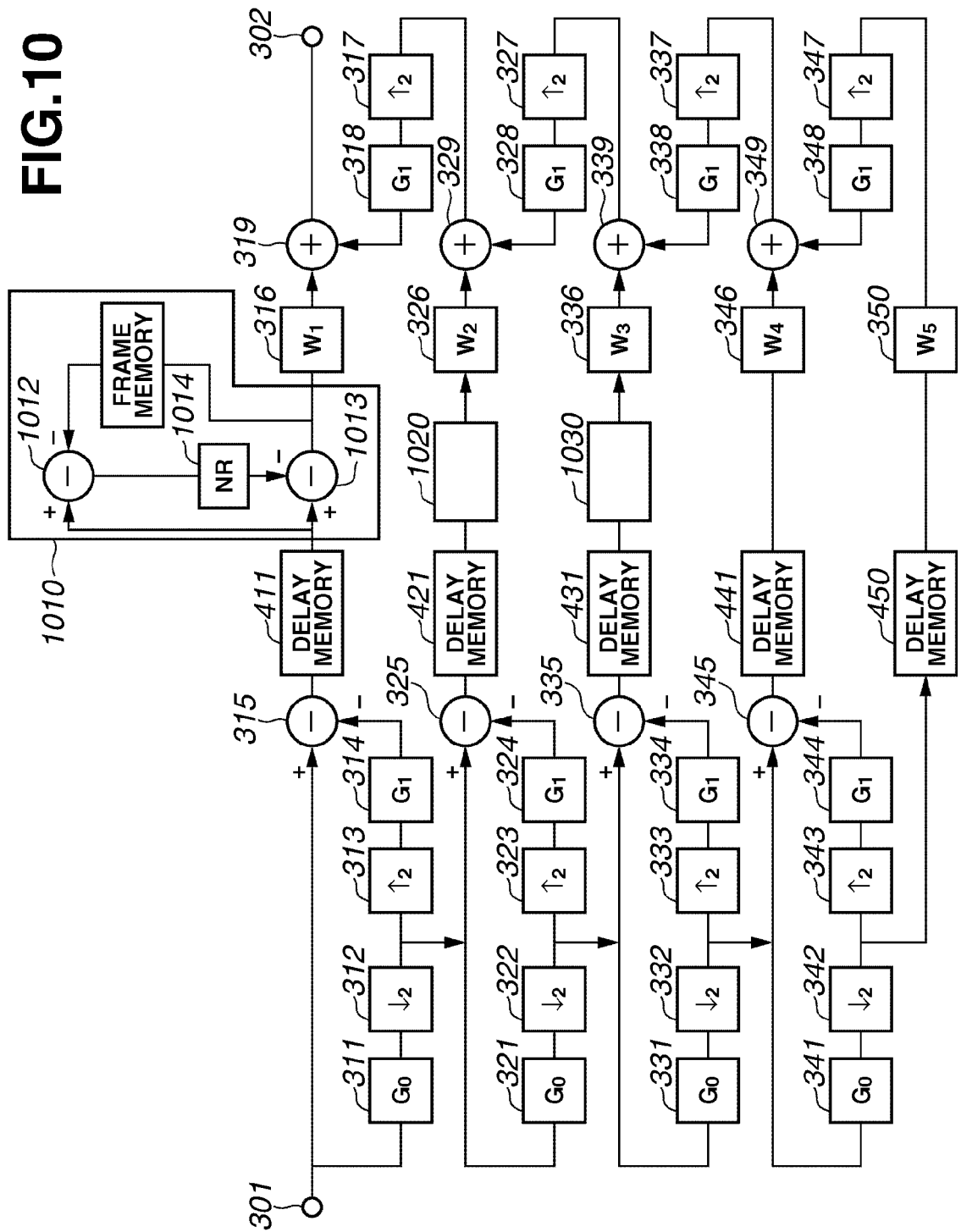
FIG. 10 illustrates an example of a configuration of a second image processing unit illustrated in FIG. 9.

FIG. 10 illustrates an example of a configuration of the second image processing unit 920 illustrated in FIG. 9. In FIG. 10, each component having the same function as the component illustrated in FIGS. 1 to 4 is designated with the same reference numeral. Thus, a description of such a component is not repeated.

As described above, the second image processing unit 920 executes inter-frame noise reduction processing in addition to multi-resolution analysis processing without reducing the amount of memory access. With such a configuration, the amount of memory access in this image processing unit according to the third exemplary embodiment is increased to twice that of memory access in the image processing apparatus according to the first exemplary embodiment which is caused by the addition of the inter-frame noise reduction processing. However, the second image processing unit 920 is capable of achieving fine control of the inter-frame noise reduction processing.

Inter-frame noise reduction units 1010, 1020, and 1030 illustrated in FIG. 10 execute smoothing of a plurality of high-frequency sub-images, which are obtained by frequency decomposition, in a time direction so as to reduce noise by utilizing correlation between frames. The noise reduction unit 1010 includes a frame memory 1011, subtraction units 1012 and 1013, and a nonlinear processing unit 1014. Although not illustrated in FIG. 10, the noise reduction units 1020 and 1030 are configured in the same way to the noise reduction unit 1010.

The frame memory 1011, the subtraction units 1012 and 1013, and the nonlinear processing unit 1014 in the noise reduction unit 1010 correspond to the frame memory 611, the subtraction units 612 and 613, and the nonlinear processing unit 614 in the noise reduction unit 610 illustrated in FIG. 5. The noise reduction unit 1010 is similar to the noise reduction unit 610, except that the noise reduction unit 1010 is provided at a subsequent stage of a delay memory. Thus, a detailed description of the noise reduction unit 1010 is omitted.

The second image processing unit 1020 illustrated in FIG. 10 can execute inter-frame noise reduction processing at the time of image reconstruction (the first exemplary embodiment needs executing the inter-frame noise reduction processing at the time of frequency decomposition). Consequently, the second image processing unit 1020 can control inter-frame noise reduction processing of a high-frequency sub-image based on low-frequency sub-images of two kinds of images to be used for reconstruction.

Generally, according to the result of gamma processing performed on image data and nonlinear processing, which depends upon image pickup/display devices, noise is visually highly perceived at a certain level of an image, while noise is visually unnoticed at another certain level of the image. The image level of an image largely depends on a low-frequency sub-image while most of noise is present in a high-frequency sub-image. Thus, a degree of application of the inter-frame noise reduction processing is controlled utilizing this property, based on the level of the low-frequency subimage. The degree of application of the inter-frame noise reduction processing is set to be high at the image level where noise is highly visible. On the other hand, the degree of application of the inter-frame noise reduction processing is set to be low at the image level where noise is visually unnoticeable. Consequently, visual effects of the noise reduction processing can be enhanced.

One of the most effective methods for reducing the X-ray exposure dose of a subject is to reduce the X-ray radiation dose. Thus, generally, the X-ray exposure dose per unit time is reduced by decreasing an imaging frame rate according to a speed of movement of an X-ray imaging target part of the subject. When the imaging frame rate is low, an amount of image data to be processed per unit time is small. Consequently, memory access becomes low. This generates leeway for the amount of memory access.

Accordingly, in the image processing apparatus according to the third exemplary embodiment, it is effective to perform the following control operation. That is, in a case where there is leeway for the amount of memory access in an operation of the entire image processing apparatus, the second image processing unit 1020 is used to execute the processing so as to enhance the effects of the noise reduction processing. On the other hand, in a case where the frame rate is high, and there is little leeway for the amount of memory access in the image processing apparatus, the first image processing unit 1010 is used to execute the processing so as to reduce the amount of memory access.

More specifically, in the second image processing unit 920 illustrated in FIG. 9, the generated high-frequency difference image data is stored in the delay memory. At a timing at which the image data is needed for the reconstruction processing, the image data is read from the delay memory. Then, the noise reduction processing is performed on the read image data. Subsequently, the image data having undergone the noise reduction processing is used for the reconstruction processing. In addition, the image data having undergone the noise reduction processing is stored in the frame memory so as to be used as reference image data in the noise reduction processing of an image of the next frame.

On the other hand, as illustrated in FIG. 9, in the first image processing unit 910, just after a high-frequency sub-image is generated, noise reduction processing is performed on generated high-frequency sub-image. Then, the high-frequency sub-image having the noise reduction processing is stored in the frame memory. At a timing at which the reconstruction processing needs the image data, the image data is read from the frame memory to be used as it is in the reconstruction processing.

In some case other than adjusting the frame rate, the image size of a processing target image area is changed according to movement or change of a subject. In a case where the frame rate is constant, the following switching control operation is effective in the present embodiment. That is, in a case where the image size of the target image area is small, the second image processing unit 920 is used to execute the processing. On the other hand, in a case where the image size of the target image area is large, the first image processing unit 910 is used to execute the processing.

As described above, according to the third exemplary embodiment, the image processing unit to be used to execute the processing can be switched between the first image processing unit 1010 and the second image processing unit 1020 based on, e.g., the frame rate. Consequently, the image processing can be achieved by appropriate switching, based on an input moving image, between the image processing unit, which can achieve fine control of the noise reduction processing whereas the amount of memory increases, and the image processing unit which can reduce the amount of memory access whereas the fine control of the noise reduction processing cannot be achieved.

Figure 11:
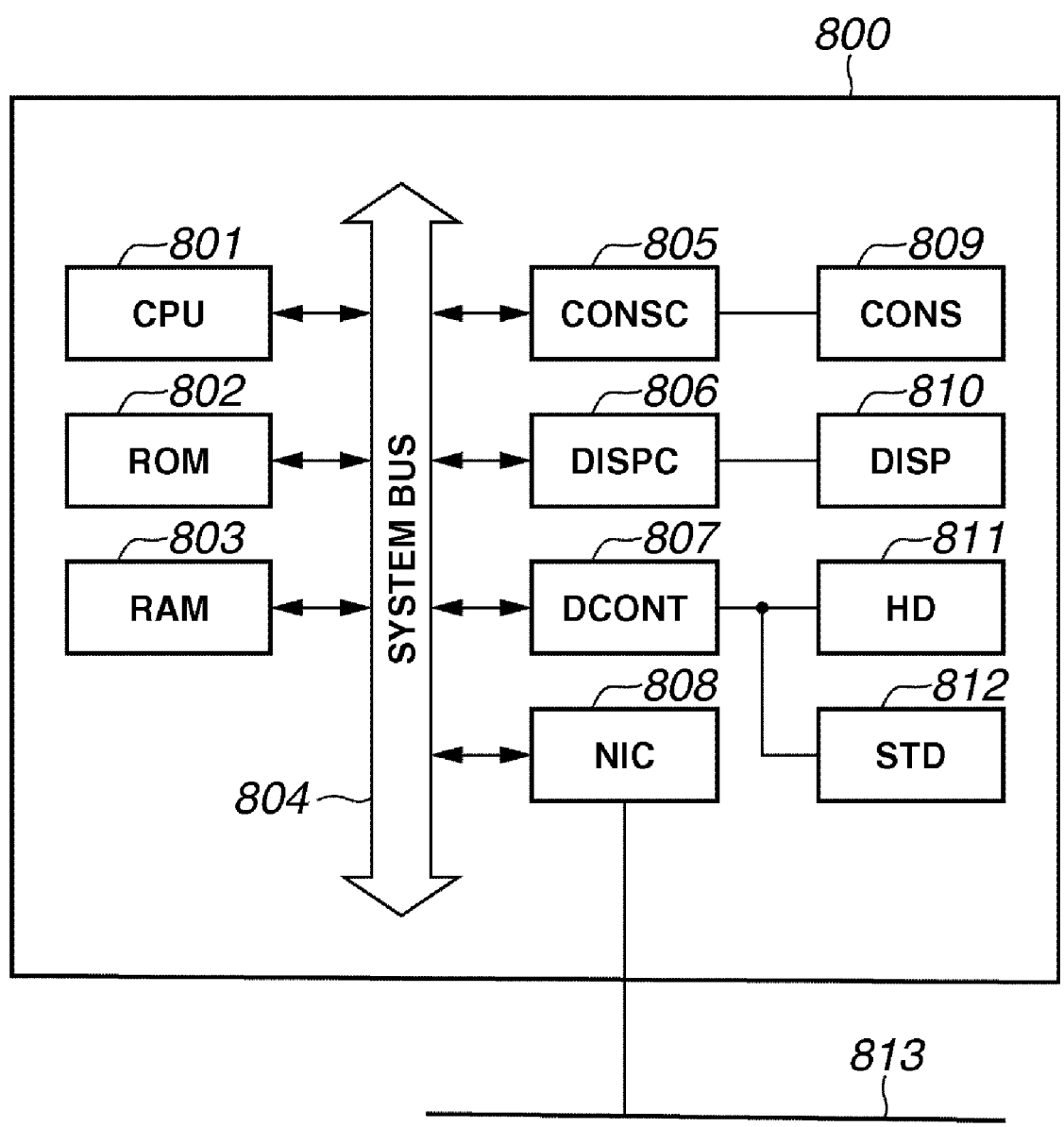
FIG. 11 illustrates a hardware configuration of an image processing apparatus according to an exemplary embodiment of the present invention.

FIG. 11 illustrates an example of a hardware configuration of an image processing apparatus according to one of the first to third exemplary embodiments of the present invention.

As illustrated in FIG. 11, an image processing apparatus 800 includes a central processing unit (CPU) 801, a read-only memory (ROM) 802, and a random access memory (RAM) 803. The image processing apparatus 800 includes also a controller (CONSC) 805 of an operation/input unit (CONS) 809, and a display controller (DISPC) 806 for a display device (DISP) 810, such as a cathode-ray tube (CRT) or a liquid crystal display (LCD), serving as a display unit. The image processing apparatus 800 includes also a controller (DCONT) 807 for a storage device (STD) 812, such as a hard disk (HD) 811 and a floppy disk, and a network interface card (NIC) 808. Such functional units 801, 802, 803, 805, 806, 807, and 808 are connected to one another via a system bus 804.

The CPU 801 controls component units connected to the system bus 804 by executing software stored in the ROM 802 or the HD 811 or software supplied from the STD 812. That is, the CPU 801 reads a processing program for performing the above-described operation from the ROM 802, the HD 811, or the STD 812 and executes the read processing program to perform a control operation for implementing the above-described operations of one of the first to third exemplary embodiments. The RAM 803 functions as a main memory or a work area for the CPU 801.

The CONSC 805 controls inputting of instructions and images from the CONS 809. The DISPC 806 controls a display operation of the DISP 810. The DCONT 807 controls access to the HD 811 and the STD 812, which store a boot program, various application programs, user files, network management programs, and processing programs. The NIC 808 exchanges data bi-directionally with the other units on network 813.

For example, the CPU 801 for executing the processing programs supplied thereto implements the functions of the decomposition unit, the noise reduction unit, the coefficient change unit, the reconstruction unit, and a read unit. The RAM 803 implements a frame delay unit. Although a moving image to be processed is supplied by the CONS 809 to the image processing apparatus 800, a moving image can be supplied to the image processing apparatus 800 through the network 813. Alternatively, a moving image can be stored in and supplied from the HD 811 and the STD 812.

Other Exemplary Embodiment

The present invention includes a software program implementing the functions of the above-described exemplary embodiments supplied to a computer (or a CPU or a microprocessing unit (MPU)) in a system or apparatus connected to various devices so as to operate the various devices and implement the functions of the above-described exemplary embodiments. Then, the functions of the above-described exemplary embodiments are implemented by causing the various devices to operate according to the program stored in the system or apparatus.

In this case the software program itself, read from a storage medium on which it is stored, implements the functions of the above-described exemplary embodiments. Such a software program itself constitutes the present invention. Units for supplying such a software program, e.g., a storage medium, in which the software program code is stored, constitute the present invention. For example, a floppy disk, a hard disk, an optical disk, a magneto-optical disk, a compact disc read-only memory (CD-ROM), a magnetic tape, a nonvolatile memory card, and a read-only memory (ROM) can be used as the storage media for storing such a program.

In a case where the supplied program implements the functions of the above-described exemplary embodiments in cooperation with an operating system or other application software or the like running on the computer, such a program is included in an exemplary embodiment of the present invention.

In a case where the supplied program is stored in a memory provided in a function expansion board inserted into a computer or in a function expansion unit connected to a computer, and where subsequently, part or all of actual processing operations using a CPU or the like provided on the function expansion board or in the function expansion unit is performed according to instructions from the program so as to implement the functions of the above-described exemplary embodiments, the program is included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-149556 filed Jun. 5, 2007, which is hereby incorporated by reference herein in its entirety.

What is claimed is:

1. An image processing apparatus comprising:
a first frame memory;
a second frame memory;

a first subtraction unit configured to subtract contents of the first frame memory from a first high-frequency image of a current frame image signal to generate a first signal;

a second subtraction unit configured to subtract contents of the second frame memory from a second high-frequency image of the current frame image signal to generate a second signal;

a first nonlinear processing unit configured to nonlinearly convert the first signal to generate a nonlinearly converted first signal;

a third subtraction unit configured to subtract the nonlinearly converted first signal from the first high-frequency image of the current frame image signal to generate a noise reduced first image signal;

a fourth subtraction unit configured to subtract the nonlinearly converted second signal from the second high-frequency image of the current frame image signal to generate a noise reduced second image signal;

a first storing unit configured to store the noise reduced first image signal in the first frame memory;

a second storing unit configured to store the noise reduced second image signal in the second frame memory;

a first reading unit configured to read out the noise reduced first image from the first frame memory after a time shorter than a predetermined time has passed since the noise reduced first image has been stored in the first frame memory for constructing an image based on the noise reduced first image and the noise reduced second image, wherein, while the first reading unit is reading out the noise reduced first image from the first frame memory after the predetermined time has passed since the noise reduced first image is stored in the first frame memory, the first subtraction unit subtracts the contents of the first frame memory from a first high-frequency image of a next frame image; and a second reading unit configured to read out the noise reduced second image from the second frame memory after a time shorter than the predetermined time has passed since the noise reduced second image is stored in the second frame memory for constructing the image based on the noise reduced first image and the noise reduced second image, wherein, while the second reading unit is reading out the noise reduced second image from the second frame memory after the predetermined time has passed since the noise reduced second image is stored in the second frame memory, the second subtraction unit subtracts the contents of the second frame memory from a second high-frequency image of the next frame image.

2. A method for processing an image, the method comprising:

subtracting contents of a first frame memory from a first high-frequency image of a current frame image signal to generate a first signal, and subtracting contents of a second frame memory from a second high-frequency image of the current frame image signal to generate a second signal;

nonlinearly converting the first signal to generate a nonlinearly converted first signal, and nonlinearly converting the second signal to generate a nonlinearly converted second signal;

generating a noise-reduced signal by subtracting the nonlinearly converted first signal from the first high-frequency image of the current frame image signal, and generating a noise reduced second image signal by subtracting the nonlinearly converted second signal from the second high-frequency image of the current-frame image signal;

storing the noise reduced first image signal in the first frame memory, and storing the noise reduced second image signal in the second frame memory;

reading out the noise reduced first image from the first frame memory after a time shorter than a predetermined time has passed since the noise reduced first image is stored in the first frame memory for constructing an image based on the noise reduced first image and the noise reduced second image, wherein, while reading out the noise reduced first image from the first frame memory after the predetermined time has passed since the noise reduced first image is stored in the first frame memory, subtracting the contents of the first frame memory from a first high-frequency image of a next frame image is performed; and reading out the noise reduced second image from the second frame memory after a time shorter than the predetermined time has passed since the noise reduced second image is stored in the second frame memory for constructing the image based on the noise reduced first image and the noise reduced second image, wherein, while reading out the noise reduced second image from the second frame memory after the predetermined time has passed since the noise reduced second image is stored in the second frame memory, subtracting the contents of the second frame memory from a second high-frequency image of the next frame image is performed.

3. A machine-readable storage medium storing a computer program which causes a computer to execute the method of claim 2.

* * * * *